# (12) United States Patent
Bou-Ghannam et al.

(10) Patent No.: US 7,945,620 B2
(45) Date of Patent: May 17, 2011

(54) CHAT TOOL FOR CONCURRENTLY CHATTING OVER MORE THAN ONE INTERRELATED CHAT CHANNELS

(75) Inventors: Akram A. Bou-Ghannam, Lake Worth, FL (US); Brent L. Davis, Deerfield Beach, FL (US); Peeyush Jaiswal, Boca Raton, FL (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 11/423,772

(22) Filed: Jun. 13, 2006

(65) Prior Publication Data

US 2007/0288560 A1    Dec. 13, 2007

(51) Int. Cl.
G06F 15/16       (2006.01)
G06F 3/00        (2006.01)
G06F 3/048       (2006.01)

(52) U.S. Cl. ......... 709/204; 715/751; 715/838; 709/207
(58) Field of Classification Search .................. 709/204, 709/205, 207, 206; 715/751, 838
See application file for complete search history.

(56) References Cited

U.S. PATENT DOCUMENTS

| | | | | |
|---|---|---|---|---|
| 5,758,079 A * | 5/1998 | Ludwig et al. | ................. | 709/204 |
| 6,212,548 B1 * | 4/2001 | DeSimone et al. | ........... | 709/204 |
| 6,226,686 B1 * | 5/2001 | Rothschild et al. | ........... | 709/245 |
| 6,807,562 B1 * | 10/2004 | Pennock et al. | ............... | 709/204 |
| 7,124,164 B1 * | 10/2006 | Chemtob | ....................... | 709/204 |
| 7,240,093 B1 * | 7/2007 | Danieli et al. | ................ | 709/205 |
| 7,278,108 B2 * | 10/2007 | Duarte et al. | .................. | 715/758 |
| 7,328,242 B1 | 2/2008 | McCarthy et al. | | |
| 7,383,307 B2 * | 6/2008 | Kirkland et al. | .............. | 709/206 |
| 7,596,596 B2 * | 9/2009 | Chen et al. | ...................... | 709/204 |
| 7,617,283 B2 * | 11/2009 | Aaron et al. | ................... | 709/206 |
| 7,702,730 B2 * | 4/2010 | Spataro et al. | ................. | 709/205 |
| 7,844,673 B2 * | 11/2010 | Bostick et al. | ................ | 709/206 |
| 2002/0130904 A1 | 9/2002 | Becker et al. | | |
| 2002/0184391 A1 * | 12/2002 | Phillips | .......................... | 709/248 |
| 2003/0101343 A1 | 5/2003 | Eaton et al. | | |
| 2004/0078432 A1 | 4/2004 | Manber et al. | | |
| 2004/0078596 A1 | 4/2004 | Kent, Jr. et al. | | |
| 2005/0027696 A1 | 2/2005 | Swaminathan et al. | | |
| 2005/0060368 A1 * | 3/2005 | Wang et al. | .................... | 709/204 |
| 2005/0097440 A1 | 5/2005 | Lusk et al. | | |
| 2005/0132009 A1 | 6/2005 | Solie | | |
| 2005/0149620 A1 | 7/2005 | Kirkland et al. | | |
| 2005/0223075 A1 | 10/2005 | Swearingen et al. | | |
| 2006/0161852 A1 * | 7/2006 | Chen et al. | ..................... | 715/758 |
| 2007/0180040 A1 | 8/2007 | Etgen et al. | | |

* cited by examiner

Primary Examiner — Shawki S Ismail
Assistant Examiner — Farzana Huq
(74) Attorney, Agent, or Firm — Patents on Demand, P.A.; Brian K. Buchheit; Scott M. Garrett

(57) ABSTRACT

The present invention discloses a chat tool including a chat window configured to permit a user to simultaneously receive chat messages for two or more different chat sessions, thereby permitting side discussions within a secondary chat session. Each of the different chat sessions can correspond to a session specific chat channel. Different chat sessions can include private and public sessions. The participants of a private chat session can be participants of the public chat session and/or can be able to view discussions occurring in the public chat session. Further, members of the public chat session can be unaware of the existence of the private chat session. Any number of private chat sessions can be spawned from a public chat session using an invitation option, which automatically establishes new private sessions for invited individuals.

17 Claims, 3 Drawing Sheets

CHAT TOOL FOR CONCURRENTLY CHATTING OVER MORE THAN ONE INTERRELATED CHAT CHANNELS

BACKGROUND

1. Field of the Invention

The present invention relates to the field of electronic chat communications and, more particularly, to a chat tool for concurrently chatting over more than one interrelated chat channels.

2. Description of the Related Art

Electronic chat communications, which include chat room communications, instant messaging and text messaging, are an increasingly popular means for two or more people to communication in virtual real time. For example, chat sessions for conveying a quick note are often used in lieu of a phone call between two individuals. Additionally, an ability to quickly communicate with more than one person using chat communications often saves time in collaborative efforts, such as team projects.

Sometimes during a chat session, it is desirable to have private side discussions with a select set of participants of the original chat session. For example, two or three people participating in a chat session established for a large project may wish to have a private side discussion with each other pertaining to a sub-team issue. A limited set of options exists using conventional technologies for establishing such a side discussion.

One conventional option includes sending a single message to a targeted chat participant using a "whisper mode." Whisper mode communications occur in the same chat channel as the main chat session, which typically results in relatively low security for whispered messages. Additionally, whisper mode communications are generally restricted to messages exchanged between two individuals. Further, whisper mode messages often require additional windows to be open and/or keystrokes to be entered making extensive communications via a whisper mode difficult.

Another conventional option involves privately coordinating with one or more individuals to conduct a sidebar conversation in a second chat room or chat session. This coordination can be done using "whisper mode" communications and/or using a separate communication channel to coordinate details for establishing the second chat session. For example, when an additional session is desired, often the second session will be initiated using an instant message communication channel. When the second chat session is initiated, the session conventionally occurs in a separate window often using a different communication application. Participating in multiple communication sessions, each having a different window, can require a user to continuously switch back and forth between windows. This continuous switching makes simultaneous participation in both chat sessions difficult. Also, the opening of a second communication window can consume additional computing resources, such as processor cycles and screen real estate, which can be particularly problematic when participation in the chat sessions occurs using a mobile device having limited resources.

SUMMARY OF THE INVENTION

The present invention provides a chat meeting tool that allows people to participate in multiple chat sessions using a single window. The chat sessions can occur simultaneously and can be interrelated. That is, one or more chat sessions can include sidebar discussions or secondary chat sessions branched off from the main chat session. Participants of the secondary chat sessions can each view and/or simultaneously participate in discussions occurring in the main chat session. In one arrangement, the main chat session can be either a public or a private chat session, while the secondary chat session can be a private chat session. Information conveyed in the secondary chat sessions can remain hidden from participants involved in only the main chat session.

The present invention can be implemented in accordance with numerous aspects consistent with material presented herein. For example, one aspect of the present invention can include a chat tool including a chat window configured to permit a user to simultaneously receive chat messages for two or more different chat sessions, thereby permitting side discussions within a secondary chat session. Each of the different chat sessions can correspond to a session specific chat channel. Different chat sessions can include private and public sessions. The participants of a private chat session can be participants of the public chat session and/or can be able to view discussions occurring in the public chat session. Further, members of the public chat session can be unaware of the existence of the private chat session. Any number of private chat sessions can be spawned from a public chat session using an invitation option which automatically establishes new private sessions for invited individuals.

Another aspect of the present invention can include a method of engaging in electronic chat communications which includes a step of presenting a chat window having two or more distinct sections. Each section can correspond to a chat session. Each chat session can correspond to a chat channel. At least two of the distinct sections can be simultaneously viewable by a user. Chat communications can be simultaneously and dynamically conducted within the distinct sections.

Still another aspect of the present invention can include a system for electronic chat communications that includes a public chat channel and a private chat channel. The public chat channel can be configured for a public chat session having at least three chat participants. The private chat channel can be configured for a private chat session having at least two chat participants. At least one of the chat participants of the private chat session can also be a participant of the public chat session. Each chat participant of the private chat channel can be able to simultaneously view messages of the private chat session and the public chat session within a single application.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
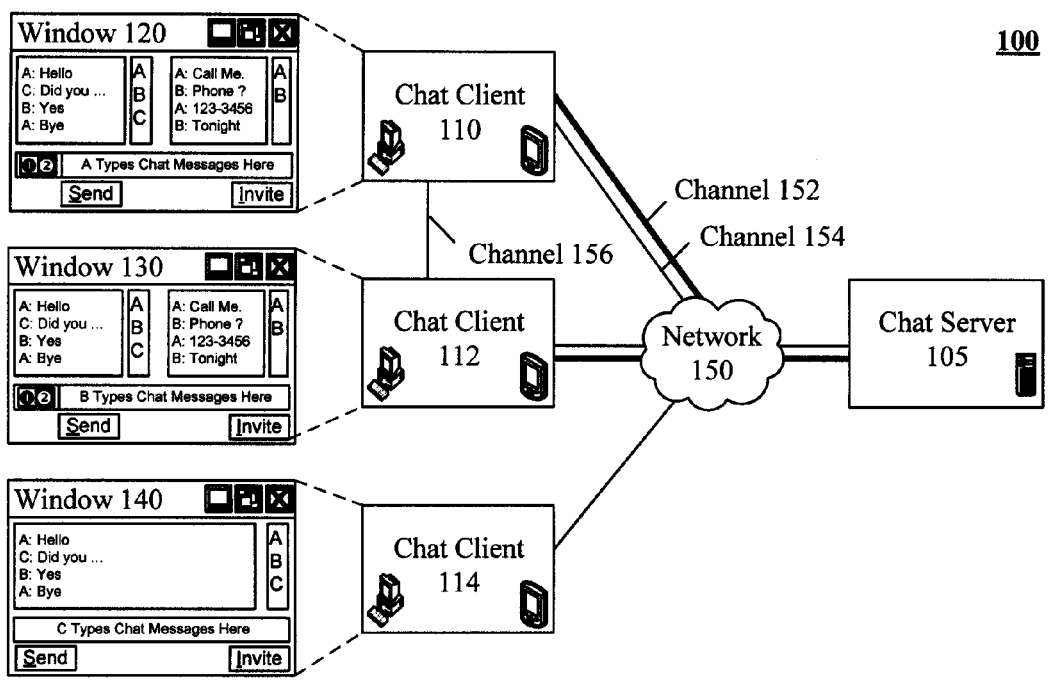
FIG. 1 is a schematic diagram of a system for chatting over multiple channels in accordance with an embodiment of the inventive arrangements disclosed herein.

FIG. 1 is a schematic diagram of a system 100 for chatting over multiple channels in accordance with an embodiment of the inventive arrangements disclosed herein. System 100 can include chat clients 110, 112, and 114, which communicate with each other over one or more chat channels.

Each chat client 110-114 can include a computing device configured to participate in electronic chat communications. Chat clients 110-114, for example, can include a desktop computer, a mobile phone, a notebook computer, a tablet computer, and the like. Each chat client 110-114 can be communicatively linked to each other via network 150. A chat server 105 can also be connected to the network 150. Chat server 105 can be any communication device that facilitates online chat discussions, such as a server that maintains one or more chat rooms.

As used herein, electronic chat communications can refer to any virtual real-time communication where two or more participants can exchange electronic messages. For example, electronic chat communications can include communications involving chat rooms. Chat rooms are virtual rooms that participants can enter to exchange communications. Each member of a chat room can view messages sent from any other member in the chat room and can send messages to other members included in the chat room. Additionally, electronic chat communications can include instant messaging (IM) communications and text messaging communications, which are typically not associated with a particular chat room. Instead, electronic chat communications involving IM communications are often initiated by one of the participants who are made aware of another IM participant's availability via an IM server (server 105).

A chat session can include any communication session in which electronic chat communications are exchanged. Hybrid digital communication sessions that include exchanges of electronic chat messages as well as additional communication mechanisms are considered chat communication sessions for purposes of this application. For example, chat communication sessions can include interactive gaming, Voice Over Internet Protocol (VoIP) speech, video streams, co-browsing, file attachments, file transfers, and the like.

Each chat session can exchange chat communications through a designated chat channel 152, 154, and/or 156. Chat channels 152-156 can be server assisted communication channels (channel 152 and 154) and/or peer-to-peer communication channels (channel 156) that do not utilize a server 105 as a communication intermediary.

Moreover, each chat channel 152-156 can be a private or public channel allowing clients 110-114 to participate in private or public chat sessions. A public chat session is a chat session having unrestricted membership, where almost anyone is permitted to enter and leave at will. Public chat sessions are usually organized by discussion topic, hobby, or interest and participants include individuals interested in exchanging messages relating to the topic. Private chat sessions are sessions having a restricted membership. Often an authorization code will be required before a person is allowed to enter a private chat session. Sometimes additional security is implemented on private chat channels, such as Secure Socket Layer (SSL) encryption, which is used to prevent unauthorized eavesdropping on a private chat channel.

Each chat client 110-114 can utilize a chat interface (window 120-140) to participate in chat sessions. Unlike conventional chat interfaces, system 100 can include interfaces where multiple chat sessions are simultaneously viewable within a single window, such as window 120 and window 130, each session occurring within a session specific section. The different chat sessions can be interrelated to one another. For example, one of the chat sessions can be a public chat session involving a set of participants, such as Participant A, Participant B, and Participant C, and another of the chat sessions can be a private chat session involving a subset of the public chat session participants, such as Participant A and Participant B. This arrangement allows members of the public chat session to engage in private sidebar conversations, while still participating in the public chat session.

To illustrate, window 120 can be associated with Participant A, window 130 can be associated with Participant B, and window 140 can be associated with Participant C. Each participant can be a participant of a public chat session. After entering the public chat session, Participant A and Participant B may wish to conduct a private side discussion or private chat session. Either Participant A or B can select an invite option and subsequently choose the other. Once the invitee accepts the invitation, a new chat session can be automatically initiated between Participants A and B only. This can occur without the knowledge of Participant C, who is still involved in the original public chat session, which still includes Participants A and B. Unlike conventional "whisper" chat modes, the newly initiated private chat session between Participants A and B is a separate chat session occurring over its own chat channel 152-156 distinct from the original chat channel 152-156 associated with the public chat session.

Although system 100 shows three participants (Participants A, B, and C) in the public chat session and two participants (Participants A and B) in the private chat channel, any number of participants can be included in either chat session. Additionally, each participant is not limited to two simultaneous chat sessions. For example, Participant B can engage in a private chat session with Participant C (not shown) while engaging in a different private chat session with participant A, and while engaging in a public chat session involving Participants A, B, and C. Additionally, the initial chat session involving Participants A, B, and C is not necessarily a public chat session, but can also be a private chat session from which Participants A and B spawn a side discussion excluding Participant C.

Network 150 can include any hardware/software/and firmware necessary to convey data encoded within carrier waves. Data can be contained within analog or digital signals and conveyed though data or voice channels. Network 150 can include local components and data pathways necessary for communications to be exchanged among computing device components and between integrated device components and peripheral devices. Network 150 can also include network equipment, such as routers, data lines, hubs, and intermediary servers which together form a data network, such as the Internet. Network 150 can also include circuit-based communication components and mobile communication components, such as telephony switches, modems, cellular communication towers, and the like. Network 150 can include line based and/or wireless communication pathways.

Figure 2:
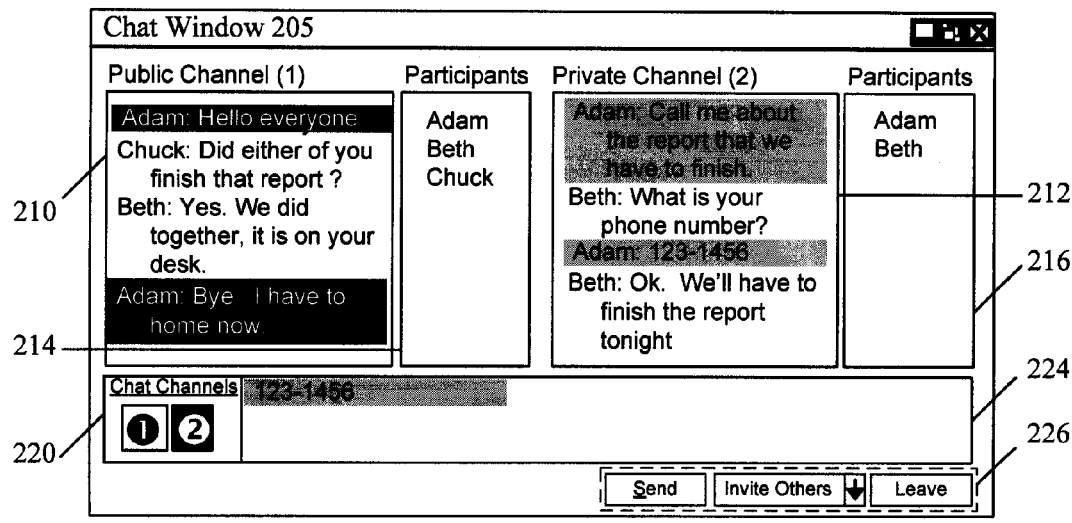
FIG. 2 presents a chat interface including a chat window for simultaneously participating in multiple chat sessions in accordance with an embodiment of the inventive arrangements disclosed herein.

FIG. 2 presents a chat interface including chat window 205 for simultaneously participating in multiple chat sessions in accordance with an embodiment of the inventive arrangements disclosed herein. Chat window 205 can be utilized in the context of a system 100 or any other system involving multiple chat sessions.

Window 205 can include section 210 and section 212, each related to a specific chat session occurring over a specific chat channel. Participant section 214 and 216 can provide a list of participants for each chat session. As shown, section 210 can contain messages conveyed over public channel (1). Participants involved in the session associated with section 210 can include Adam, Beth, and Chuck. Section 212 can contain messages conveyed over private channel (2). Participants involved in the session associated with section 212 can include Adam and Beth.

A message transmission section 224 can be used to convey messages to either active chat session. A chat channel selection section 220 can be used to select which chat session a message is to be conveyed. For example, selecting channel one in section 220 can convey messages appearing in section 224 to the chat session associated with section 210. Selecting channel two in section 220 can convey messages appearing in section 224 to the chat session associated with section 212. In one arrangement, hot key combinations can be used in addition to or in place of selection section 220. Consequently, a user can shift which chat session a message of section 224 is associated with by entering a previously established hot key combination.

In one embodiment, a visual indicator can be used to help a user of window 205 distinguish which chat session a message is directed towards. The visual indicator can include a chat session specific font color, background color, highlighting, font, size, and the like. For example, messages directed towards the first chat session by a user can be indicated by a black background and a white font color. Messages directed towards the second chat session can be indicated by a light grey background and a black font color. User messages appearing in sections 210 and 212 can follow the same color scheme, which can enforce a user's associating a particular visual indicator with a particular chat session.

Window 205 can also include an actions section 226. Action section 226 can include options for sending messages, for leaving a chat session, and for inviting participants to join a chat session. The invite option can include a drop down menu, where individual members of the main chat channel can be selectively invited to join a side discussion or a private chat channel. For example, the private chat session associated with section 212 can be automatically initiated responsive to either Adam or Beth selecting the other via the invite option.

Figure 3:
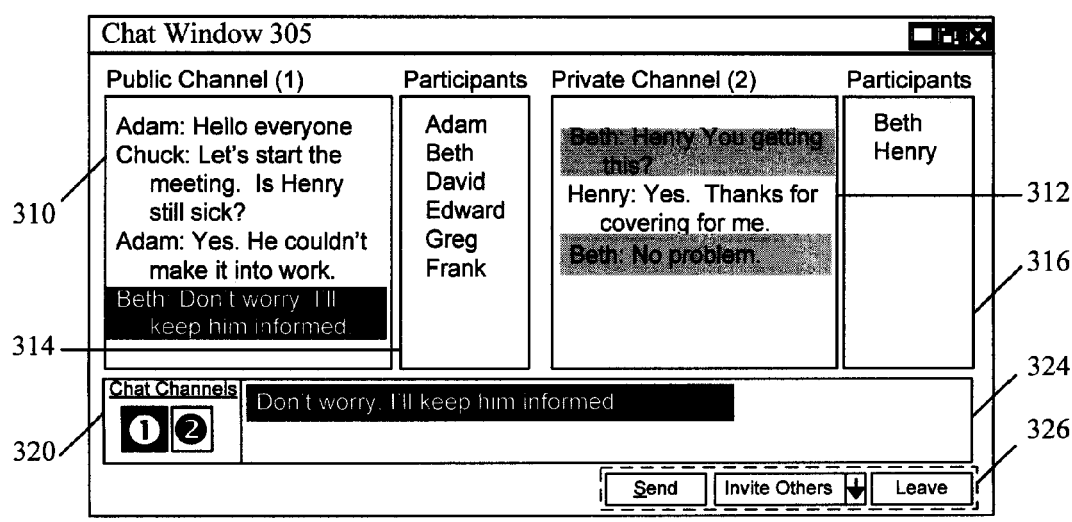
FIG. 3 presents a chat interface including a different chat window for simultaneously participating in multiple chat sessions in accordance with an embodiment of the inventive arrangements disclosed herein.

FIG. 3 presents a chat interface including chat window 305 for simultaneously participating in multiple chat sessions in accordance with an embodiment of the inventive arrangements disclosed herein.

Chat window 305 is similar to chat window 205 in that it includes chat sections 310 and 312, participant section 314 and 316, chat channel selection section 320, message transmission section 324, and action section 326, which are analogous to chat sections 210 and 212, participation sections 214 and 216, selection section 220, transmission section 224, and action section 226 respectively.

Chat window 305 shows that one or more of the participants of the private chat session can be hidden from the participants of the related public session. As shown, Henry appears in participant section 316, but not in participant section 314. Even so, Henry can be a hidden observer of messages conveyed within section 310. Private channel (2) corresponding to section 312 can be initiated by Beth inviting Henry, who is not participating in the discussion occurring in section 310.

The option to add a participant to a private chat session who is not directly participating in a related public chat session can have many applications. For example, Beth can use Henry as a consultant who is able to provide real time input to Beth related to the discussion occurring in section 310. Beth may desire the consulting advice, without informing participants of the main discussion (which as shown in section 314 would include Adam, David, Edward, Greg, and Frank) that she is actively receiving advice/feedback from Henry. It should be emphasized that window 316 allows Henry to automatically and dynamically view the same discussion occurring in section 310 that Beth is viewing. Beth is not required to cut and paste information for Henry's consumption, which would be a likely workaround necessary to produce rough equivalent results in a scenario where only conventional technologies are utilized. Additionally, Henry is able to view the history of the public chat shown in section 310 even though Henry was invited after the public chat of section 310 had begun and commenced for a period of time, if Beth wishes to allow such viewing.

It should be appreciated that the option shown in chat window 305 can be implemented in numerous manners. For example, assuming Beth is using client 110 from system 100 and that Henry is using client 112, in one arrangement chat server 105 can include a capability to provide Henry with "dynamically hidden viewing" of public channel messages. In such a scenario, two different chat channels would extend from clients 110 and 112, each connected to server 105. In another configuration, Beth's client 110 can be used to implement the dynamically hidden viewing for Henry. For example, chat server 105 can be used to establish the private chat session between Beth and Henry. Instead of receiving public chat session information from the server 105, client 112 can receive the content of the public session directly from client 110 via direct channel 156. In still another embodiment, Henry (client 112) can receive information from both chat sessions from Beth (client 110) via one or more direct channels, such as channel 156.

It should also be appreciated that interfaces shown in FIGS. 1, 2, and 3 are provided to demonstrate concepts described for an embodiment of the inventive arrangements disclosed herein. The interfaces are not intended to constrain the scope of the invention to a particular contemplated expression. Derivatives of the interfaces including different interface elements, arrangements, layouts, and the like are contemplated herein.

Figure 4:
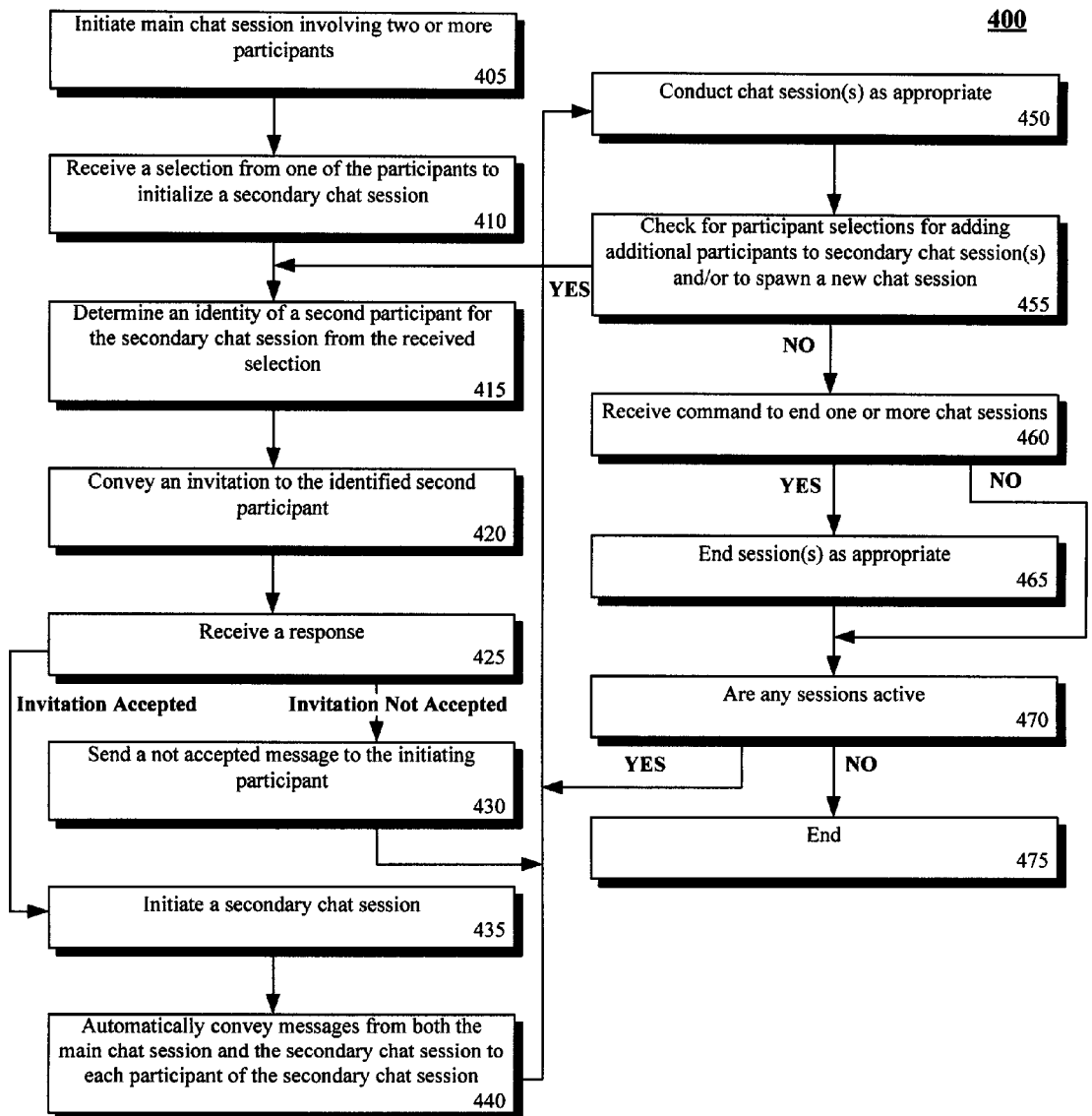
FIG. 4 is a flow chart of a method for permitting a user to concurrently participate in multiple chat sessions using a single chat window in accordance with an embodiment of the inventive arrangements disclosed herein.

FIG. 4 is a flow chart of a method 400 for permitting a user to concurrently participate in multiple chat sessions using a single chat window in accordance with an embodiment of the inventive arrangements disclosed herein. Method 400 can be performed in the context of system 100 or any system where multiple chat sessions occur.

Method 400 can begin in step 405 where a main chat session involving two or more participants can be initiated. In step 410, a selection from one of the participants can be received to initiate a secondary chat session or side discussion. The participant can designate one or more people, who may be participating in the main chat session or not, to join the secondary chat session. In one embodiment, step 410 can be performed by selecting an invite option within an open chat interface. In step 415, an identity of the second participant can be determined from the received selection.

In step 420, an invitation to join the secondary chat session can be conveyed to the identified participant. The participant can either accept or refuse the invitation, which is indicated by a response received in step 425. In step 430, if the invitation is not accepted, a not accepted notification can be conveyed to the invitation initiator. The method can then proceed from step 430 to step 450 where established chat sessions can be conducted. That is, messages can be conveyed to and from individuals participating in active chat sessions.

If the invitation is accepted in the response of step 425, the method can proceed to step 435 where a secondary chat session can be initiated. The secondary chat session can be a private chat session established via a private chat channel. In step 440, participants of the newly initiated chat session can receive messages from both the main chat session and the newly established chat session. The method can proceed from step 440 to step 450 where chat sessions can be conducted as appropriate.

In step 455, the method can check for participant invite selections. Invite selections can invite other people into an already established secondary chat session or can spawn a new private chat session. If a participant invite message is received, the method can loop from step 455 to step 415, where an identity of an invited person can be determined. If no invite message is received, the method can progress to step 460, where the method can check for commands or events to end an active chat session. If sessions exist that are to be terminated, the session(s) can be ended as appropriate. In one embodiment, ending a main chat session can automatically terminate secondary chat sessions. In another embodiment, secondary chat sessions can be maintained when a main chat session ends, but user interfaces can be automatically adjusted to no longer show a section for the main chat session.

After appropriate chat sessions are ended, the method can proceed to step 470 where the method can determine if any sessions are still active. If not, the method can end in step 475. If active chat sessions still exist, the method can loop from step 470 to step 450, where active chat sessions can be conducted as appropriate.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A chat interface implemented within software that is stored within a computer readable medium comprising:
   a chat window containing a plurality of different chat sections, each of the plurality of different chat sections displaying a different chat session and being simultaneously viewable within the chat window, each of the different chat sessions corresponding to a session specific chat channel, wherein at least one of the plurality of chat sections displays a public chat session and at least one of the plurality of chat sections displays a private chat session corresponding to the public chat session;
   a single message transmission section disposed independently within the chat window in which to enter a message; and
   a chat channel selection section disposed independently within the chat window which selects one of the different chat sessions;
   wherein a message entered in the message transmission section is automatically sent to the chat session selected in the chat channel selection section and displayed in the chat section corresponding to the chat session selected in the chat channel selection section.

2. The interface of claim 1, further comprising:
   an invitation option configured to invite a participant of the public chat session that is not participating in the private chat session to join the private chat session.

3. The interface of claim 1, wherein each participant of the private chat session is also a participant of the public chat session, and wherein at least one participant of the public chat session is not a participant of the private chat session.

4. The interface of claim 1, wherein at least one of the participants of the private chat session is not a participant of the public chat session even though that participant is able to dynamically view chat messages of the public chat session.

5. The interface of claim 1, wherein the chat sessions are visually distinguished by at least one of different font colors, different background colors, different fonts, or different font sizes used for the chat sessions.

6. The interface of claim 1, wherein a different session visual indicator is associated with user messages for the different chat sessions, wherein messages entered into the chat window shown in accordance with the session visual indicator associated with a chat session to which the entered messages are directed, whereby a user of the interface is able to tell which chat session user messages to be transmitted are directed towards by the visual indicator.

7. The interface of claim 1, wherein the chat interface handles both peer-to-peer chat sessions and server managed chat sessions.

8. A method of engaging in electronic chat communications comprising:
   within a software interface presenting a chat window having a plurality of distinct chat sections, each chat section corresponding to a different chat session, each chat session corresponding to a chat channel, wherein at least two of the distinct sections are simultaneously viewable, at least one chat section displaying a public chat session and at least one other chat section showing a private chat session corresponding to the public chat session, the chat window further presenting a single message transmission section disposed independently within the chat window in which to enter a message, and a chat channel selection section disposed independently within the chat window which selects one of the different chat sessions;

receiving a selection at the chat channel selection section selecting one of the different chat sessions; and automatically conveying messages from the message transmission section to the selected one of the different chat sessions and displayed the conveyed messages in the chat section corresponding to the chat session selected in the chat channel selection section.

9. The method of claim 8, further comprising:

identifying an invitation request input into the interface, wherein the invitation request is associated with a user designated participant of the public chat session who is not currently participating within the private chat session;

responsively inviting the designated participant to join the private chat session;

determining a response to the inventing step; and when the response is positive, including the designated participant in the private chat session.

10. The method of claim 8, further comprising:

inviting a private participant not currently participating in the public chat session to join the private chat session;

responsive to the inviting step, including the private participant in the private chat session;

permitting the private chat participant to send and receive messages related to the private chat session; and permitting the private chat participant to dynamically and automatically view messages of the public chat session without joining the public chat session.

11. The method of claim 8, further comprising:

receiving a hot key input to select one of the different chat sessions.

12. The method of claim 11, further comprising:

within the interface, depicting the message to be transmitted with a visual indicator unique to the determined chat session.

13. A system for electronic chat communications comprising:

a chat window;

a first chat section disposed independently in the chat window for displaying a public chat channel for a public chat session having at least three chat participants; and a second chat section disposed independently in the chat window for displaying a private chat channel for a private chat session having at least two chat participants, wherein at least one of the chat participants of the private chat session is also a participant of the public chat session, and wherein the first and second chat sections are simultaneously viewable and each chat participant of the private chat channel is able to simultaneously view messages of the private chat session and the public chat session in their respective chat sections;

a single message transmission section disposed independently within the chat window in which to enter a message; and a chat channel selection section disposed independently within the chat window which selects one of either the public chat session or the private chat session;

wherein a message entered in the message transmission section is automatically sent to the chat session selected in the chat channel selection section and displayed in the chat section corresponding to the chat session selected in the chat channel selection section.

14. The system of claim 13, wherein the private chat session is initiated by one of the participants of the public chat channel using an option of a chat interface.

15. The system of claim 14, wherein at least two participants of the private chat session are simultaneously participating in the public chat session, and wherein at least one of the participants of the public chat session is not a participant of the private chat session.

16. The system of claim 13, wherein the public and private chat sessions are visually distinguished by at least one of different font colors, different background colors, different fonts, or different font sizes used for the public and private chat session.

17. The system of claim 13, further comprising:

a chat server which maintains the public chat channel and the private chat channel, wherein the chat server establishes the private chat channel responsive to a request from one of the participants of the public chat channel.

\* \* \* \* \*